United States Patent [19]
Yasui et al.

[11] Patent Number: 6,128,637
[45] Date of Patent: Oct. 3, 2000

[54] ARITHMETIC UNIT AND OPERATING METHOD

[75] Inventors: Keisuke Yasui; Teruo Okabe, both of Tokyo, Japan

[73] Assignee: Kabushiki Kaisha Sega Enterprises, Tokyo, Japan

[21] Appl. No.: 09/055,218

[22] Filed: Apr. 6, 1998

[30] Foreign Application Priority Data

Apr. 7, 1997 [JP] Japan .................................. 9-088001

[51] Int. Cl.[7] ...................................................... G06F 7/38
[52] U.S. Cl. ........................................................... 708/290
[58] Field of Search ................................... 708/290, 502, 708/500, 605, 606, 654

[56] References Cited

U.S. PATENT DOCUMENTS

| 5,157,624 | 10/1992 | Hesson | 708/502 |
| 5,220,524 | 6/1993 | Hesson | 708/502 |
| 5,768,171 | 6/1998 | Chow | 708/502 |
| 5,862,059 | 1/1999 | Matula et al. | 708/654 |

OTHER PUBLICATIONS

Hennessy, et al., Computer Architecture: A Quantitative Approach, 1993. pp. 648–653.
Hwang, Kai, Computer Arithmetic Principles, Architecture, and Design, 1979, pp. 302–307.

*Primary Examiner*—Tan V. Mai
*Attorney, Agent, or Firm*—Finnegan, Henderson, Farabow, Garrett & Dunner, L.L.P.

[57] ABSTRACT

Methods and systems consistent with the present invention provide an arithmetic unit, which uses a high speed yet small circuit, using a highly precise method for numerical interpolation that uses Newton-Raphson method.

A table for referencing sampling values and operation results is stored successively and alternately in two simultaneously accessible memories 422, 423. A table reference address determining portion 4211 takes the table reference address from the input B. The access control circuit 4212 prepares an address for accessing each memory from the table reference address and reads table values. The interpolation operating portion 4213 interpolates the table value at a precision of half the final precision. The Newton-Raphson operation 4214 performs the Newton-Raphson operation once with the primary interpolated numerical value as the initial value and attains the calculation results with the final precision by precise square convergence.

9 Claims, 11 Drawing Sheets

ARITHMETIC UNIT AND OPERATING METHOD

BACKGROUND OF THE INVENTION

1. Field of the Invention

The present invention relates to an improved arithmetic unit and operating method, for effecting numerical calculations using interpolation, and more particularly to a high speed and small scale arithmetic unit and operating method, which are highly precise, through interpolation of a value referenced from a table followed by the Newton-Raphson operation.

2. Description of the Related Art

Perspective conversion and the normalization of normal vectors on screen are necessary in computer graphics. The calculations used in these processes, such as division, inverse, and inverse square root, include a large number of repetitive processes; for this reason, these calculations are performed with software and the amount of calculations becomes large, causing reduced performance of the entire system. In particular, pipeline systems, often used in computer graphics, are characterized by process flow without repetitive processes. Calculations with many repetitive processes do not work in a pipeline system.

Hardwiring these calculations, such as division, inverse, inverse square root, and the like, was considered as a way to raise processing speed. However, when circuits are not designed with efficient algorithms, circuits become large in scale. Possible problems include increased costs, increased temperatures due to heat during circuit operation, increased number of design steps, and increased human error.

The methods for calculations such as division and inverse of square root can be broadly classified as the "table reference method," "longhand method," and the "table reference plus Newton-Raphson repetition method." In the table reference method, for example, a table of inverse values is prepared for a limited domain of input values, the inverse value corresponding to the input value is referenced, and the result of the calculation is attained. In the table reference method, the number of sets of sampling values, picked up at prescribed intervals from a range of input values, and inverse values, corresponding to the sampling values, is limited. For this reason, the value closest to the actual input value is referenced from among the sampling values in the table. As a result, there is a discrepancy between the actual input value and the sampling value; this has an undesirable effect on the precision of the calculation results. Oppositely, the types of sampling values in the table must be increased to improve the precision of the calculation results and the table inevitably becomes large in scale.

The longhand method, in division for example, is the method of repeating the process of storing the results of subtracting the divisor (dividing number) from the dividend (number divided), moving the divisor one column to the right, and subtracting it again. The disadvantage is the long time necessary for attaining the results.

The table reference plus Newton-Raphson repetition method is the method for finding the results of the calculation with final precision by applying the Newton-Raphson operation repeatedly to an initial value determined by referencing the table. Details of the Newton-Raphson operation are explained here.

The Newton-Raphson operation is one solution for finding the root of the equation $f(x)=0$; FIG. 12 shows the principle of this solution. Specifically, for the curve $y=f(x)$, an appropriate starting value $x_0$ is used as the initial value, a vertical line is drawn from this $x_0$, and the point $P_0$ where the vertical line intersects the curve $y=f(x)$ is found. Then a tangent to the curve is drawn at $P_0$, and the point $x_1$ where this tangent intersects the X axis is found. In the same way, a vertical line is drawn from $x_1$, a point $P_1$ where the vertical line crosses the curve $y=f(x)$ is found, a tangent is drawn at this point $P_1$, and the point $x_2$ where the tangent intersects the x axis is found. This operation is repeated to find $x_1$, $x_2$, ..., $x_i$ ...; $x_i$ gradually approaches, in effect converges upon, the root alpha of the formula $f(x)=0$. This type of calculating method is called a method of successive approximation.

Here, the equation for the tangent at $P_0$ becomes $$y = f'(x_0)(x-x_0) + f(x_0)$$

if $f(x)$ is differentiable. A formula for finding $x_1$ is created from the equation of the tangent, but because $x_1$ is an x intercept, $y=0$ when $x=x_1$. When this is substituted in the equation for the tangent and $x_1$ is found, then $$0 = f'(x_0)(x_1-x_0) + f(x_0)$$

$$x_1 - x_0 = -f(x_0)/f'(x_0)$$

$$x_1 = x_0 - f(x_0)/f'(x_0)$$

To generalize this equation, $x_i$ and $x_{i+1}$ are substituted for $x_0$ and $x_1$ respectively and the equation for finding $x_{i+1}$ from $x_i$ is written as follows.

$$x_{i+1} = x_i - f(x_i)/f'(x_i)$$

($i=0, 1, 2, \ldots$)

The root of the equation $f(x)=0$ is found with the Newton-Raphson method by inputting an appropriate initial value for x0 and repeating the aforementioned calculation. Actually, when the equation $f(x)$ is expressed using a constant A, $Y=1/x$ becomes $$f(x) = 1/x - A$$

and therefore, the root for $f(x)=0$ is found. With the Newton-Raphson method, $$x_{i+1} = x_i - f(x_i)/f'(x_i)$$

$$= x_i - (1/x_i - A)/(-1/x_i^2)$$

$$= x_i + x_i - Ax_i^2 = x_i - x_i(Ax_i - 1)$$

This final item $-x_i(Ax_i-1)$ means that the error between the actual product and 1 is found and $x_i$ is revised according to the error, because the value $x_i$ found at that time is multiplied by the aforementioned constant A and this product properly becomes 1 if there is no error. Because of this repeated correction (revision) of the value using the final item $-x_i(Ax_i-1)$, the final item $-x_i(Ax_i-1)$ is called the correction.

In other words, the Newton-Raphson operation requires the calculation of the correction $-x_i(Ax_i-1)$; but the correction can be calculated with a small scale calculation if the initial precision is close to the true value. Moreover, the Newton-Raphson operation recursively improves precision; the aforementioned Newton-Raphson repetition method therefore improves precision by applying the Newton-Raphson method once more to the $x_{i+1}$ attained here. The aforementioned Newton-Raphson repetition method can be realized mathematically, but the circuits become extremely complex when this method is hardwired.

In the table reference plus Newton-Raphson repetition method, the initial value for the aforementioned Newton-Raphson operation is referenced from the table. In this case, the repetition of the Newton-Raphson operation can be reduced if the initial value is highly precise and close to the true value. For this reason, it is thought that the precision of the initial value attained from the table is improved and the repetition of the Newton-Raphson operation is reduced.

However, a problem is that the table becomes large in scale, as noted for the table reference method, in order to attain a precise initial value from the table. Also, when the repetition of the operation is hardwired, each repetition must have a corresponding portion of the circuit. For this reason, an increased circuit scale results from performing the Newton-Raphson operation two or more times. Furthermore, the repetition of the processes causes the problem of increasing the time difference (latency) from when the input value is provided output terminal the system to when the results are output.

Also, the sign of the aforementioned initial value used in the process of the Newton-Raphson operation varies because of the influence of error. A sign determination circuit is necessary for calculating a numerical value which may be positive or negative. This causes the problem of further increasing the complexity of the circuit.

SUMMARY OF THE INVENTION

With the foregoing in view, it is an object of the present invention to provide an algorithm which is most efficient in the case of hardwiring calculations such as those used in CG (computer graphics) technology, such as the inverse of square roots, or dividers (inverse operators). Specifically, an object of the present invention is to provide a high speed and small scale arithmetic unit and operating method, which are highly precise, through interpolation of a value referenced from a table and using the interpolated value as the initial value of the Newton-Raphson operation.

Also, another object of the present invention is to provide an arithmetic unit and operating method, wherein the circuit used is small scale, through standardizing the sign of the correction used in the Newton-Raphson operation.

Also, another object of the present invention is to provide an arithmetic unit and operating method wherein two adjacent table values are read at high speed using two memories for reading data at the same time in one access cycle.

Also, another object of the present invention is to provide an arithmetic unit and operating method, wherein a high speed system is possible in the case where the arithmetic unit and operating method are combined with a system for processing computer graphics, by finding the inverse of the numerical value provided or the inverse of the square root.

Also, another object of the present invention is to provide an arithmetic unit and operating method for reading pairs of desired table values, using the least significant bit of the address provided, when reading table values stored in both of two memories.

To achieve the aforementioned objects, the arithmetic unit of the present invention comprises: interpolation means for interpolating, at a precision for an initial value, the table for finding the operation results corresponding to the input value and the value found from the aforementioned table using operation results calculated in advance; and means for correcting the interpolated value to the final precision with the Newton-Raphson operation.

Also, the operating method of the. present invention is the method of the invention of the aforementioned arithmetic unit and comprises: an interpolation process for interpolating, at a precision for initial value of a Newton-Raphson operation, the table process for finding the operation results corresponding to the input value and the value found from the aforementioned table using the operation results calculated in advance; and a correction process for correcting the interpolated value to the final precision with the Newton-Raphson operation.

Preferably, interpolation is performed to a certain precision for the initial value (table value) attained from the aforementioned table. For this reason, the table can be reduced in size because the amount of data to be interpolated decreases; meanwhile, the Newton-Raphson operation can attain the final precision (of bits) with one operation, since an initial value with precision (of bits) improved by interpolation is used. Specifically, the table contents remain small in scale because the Newton-Raphson operation absorbs the error between the true value and the table value; also, the circuit becomes small scale and high speed because repetition of the Newton-Raphson operation is unnecessary. Since each iteration in the Newton-Raphson operation doubles the number of correct bits in the result, the precision of the final result can be controlled by controlling the precision (bits) of the initial values.

Preferably, the aforementioned interpolation means attains an interpolated value by adding the two values found from the aforementioned table at proportions corresponding to the closeness to the original sampling value and the aforementioned input value.

Preferably, the interpolated value is found at a high speed by a simple process of adding the two values found from the aforementioned table at proportions corresponding to the closeness to the original sampling value and the aforementioned input value. In other words, the two values found from the table are such that the input value falls within the original sampling values; the aforementioned calculation means that part of the curve of the original function is nearly linear.

Preferably, in the aforementioned table, the value of the aforementioned operation results is shifted so that the sign of the correction used in the aforementioned Newton-Raphson operation is standardized. Also, in the arithmetic unit of the present invention as well, preferably, the value of the aforementioned operation results is shifted in the aforementioned table so that the sign of the correction used in the aforementioned Newton-Raphson operation is standardized.

Because the sign of the correction used in the Newton-Raphson operation is standardized in this way, a sign determination circuit becomes unnecessary and the circuit can be further decreased in scale.

Preferably, the aforementioned arithmetic unit is constituted to find the inverse of the numerical value provided or the inverse of square root of the numerical value provided.

In computer graphics, the inverse and inverse of square root are frequently calculated; these calculations in particular require a large amount of resources. These calculations are processed at high speed with a combination of the table reference, linear interpolation as the primary operation, and Newton-Raphson operation as the secondary opration; this contributes greatly to increasing the speed of the entire system.

Another arithmetic unit relating to the present invention comprises a first memory and second memory for alternately and successively storing data; the aforementioned first memory and second memory are constituted so that data is read at the same item in one access cycle. Also, the operating method relating to the present invention uses the first and second memory for alternately and successively storing data and reads data, at the same time in one access cycle, from the aforementioned first memory and second memory.

The present invention is provided a first and second memory for simultaneous reading of data, whereby ordered data can be stored alternately in the first and second memory. For any combination of adjacent data, therefore, one datum is stored in the first memory and the other is stored in the second memory. For this reason, two adjacent data can be read by accessing the first and second memory at the same time in one access cycle; therefore, the time required for reading can be reduced by half and the processing speed increased.

The aforementioned other arithmetic unit preferably comprises access control means for accessing the aforementioned first memory and second memory on the basis of the provided address. The aforementioned access control means is constituted to receive additional information along with the address for accessing the memory and to access the aforementioned first memory and second memory in two modes according to the contents of the aforementioned additional information. In the first access mode, the access control means reads data of the prescribed address from both the aforementioned first memory and second memory, and in the second access mode, the access control means reads data of the prescribed access from either of the aforementioned first memory and second memory, while reading data of an address, shifted by one from the aforementioned address, from the other memory.

In this way, when taking two adjacent data from data alternately stored between the first and second memory, the combination read can be easily controlled according to the contents of the additional information.

For example, when an address for accessing the table follows one bit of additional information, both the first and second memory are accessed at the same address when the additional information is 0 and two adjacent table values are read. In this case, the pair of table values becomes a pair comprising the table value of the second memory and the table value directly preceding the table value of the second memory. On the other hand, when the additional information is 1, the address of the second memory does not change, but the address of the first memory is incremented by 1. For this reason, the pair read comprises the table value of the second memory and the table value directly following the table value of the second memory.

In the aforementioned other arithmetic unit, the aforementioned data preferably is provided as a table for finding the operation results corresponding to the input value, using the operation results calculated in advance.

In this constitution, the values in the table are stored alternately as data in the first memory and second memory. Two adjacent values in the table can thereby be read at the same time, and the speed of the calculation for interpolating two values and finding the operation results is increased.

DESCRIPTION OF THE PREFERRED EMBODIMENTS

Next, the arithmetic unit and operating method (the apparatus), which are the preferred embodiments (embodiment) of the present invention, are explained with reference to the figures.

(1) Constitution of First Embodiment

The first embodiment provides an algorithm for preparing a small-scale, high speed operator in the case of hardwiring a high precision operator. Specifically, when dividing or calculating the inverse of a square root, the calculation is made using a method combining the table reference, primary (linear) interpolation, and Newton-Raphson methods. The first embodiment is the arithmetic unit (the apparatus) and the operating method executed in the aforementioned arithmetic unit.

Figure 1:
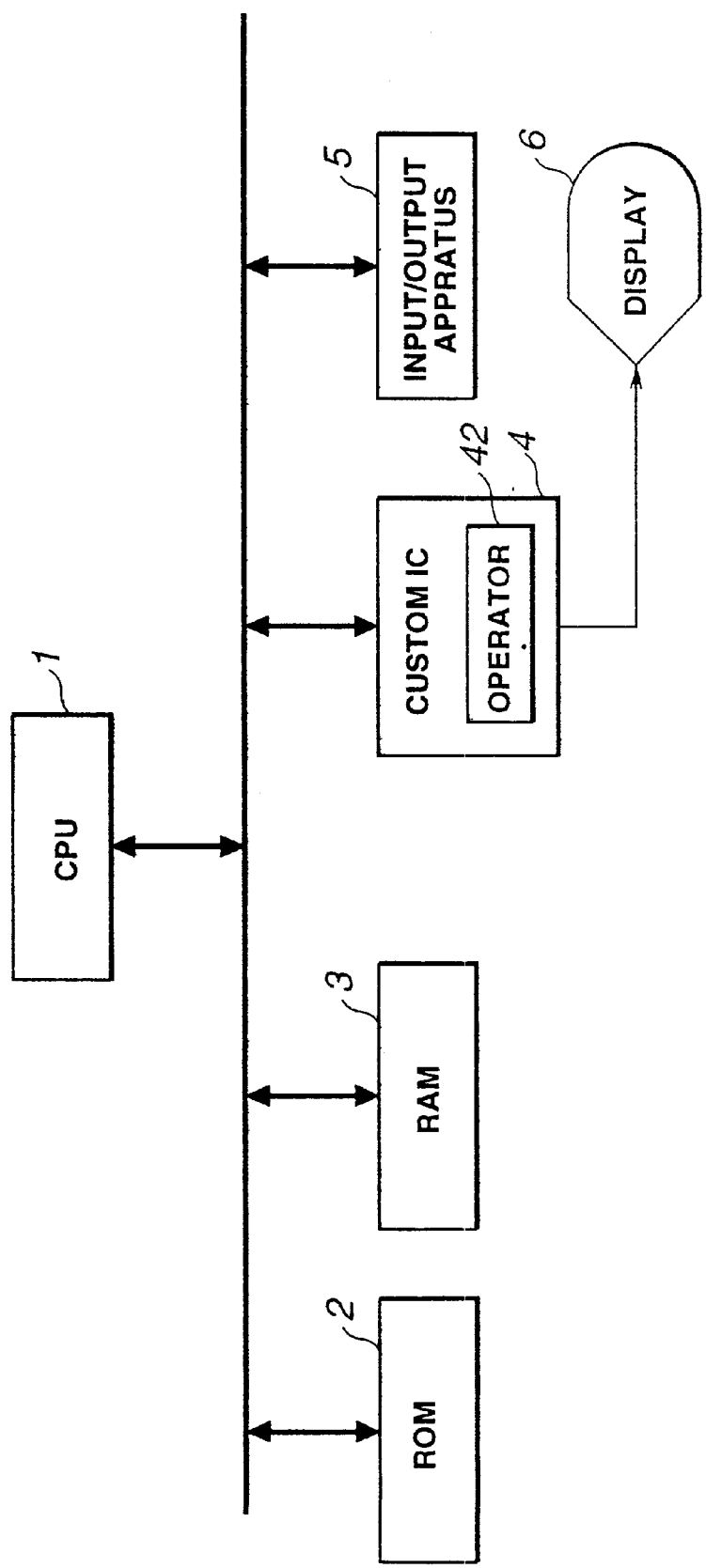
FIG. 1 is a functional block diagram showing the constitution of an example of the graphics processing unit combined with an arithmetic unit relating to a first embodiment of the present invention.

FIG. 1 shows a block diagram of the constitution of an example of a graphics processor combined with the apparatus. In the graphics processor, for example, a CPU (central processing unit) 1, ROM (read only memory for programs, data, and the like) 2, and RAM (random access memory for operations) 3 are connected to a bus B as shown in this figure. Also, a custom IC (integrated circuit) 4 for realizing user-determined logic, an input/output device 5 for reading key entry and for printing data, and a display (picture display apparatus) 6 are connected to the bus B.

Figure 2:
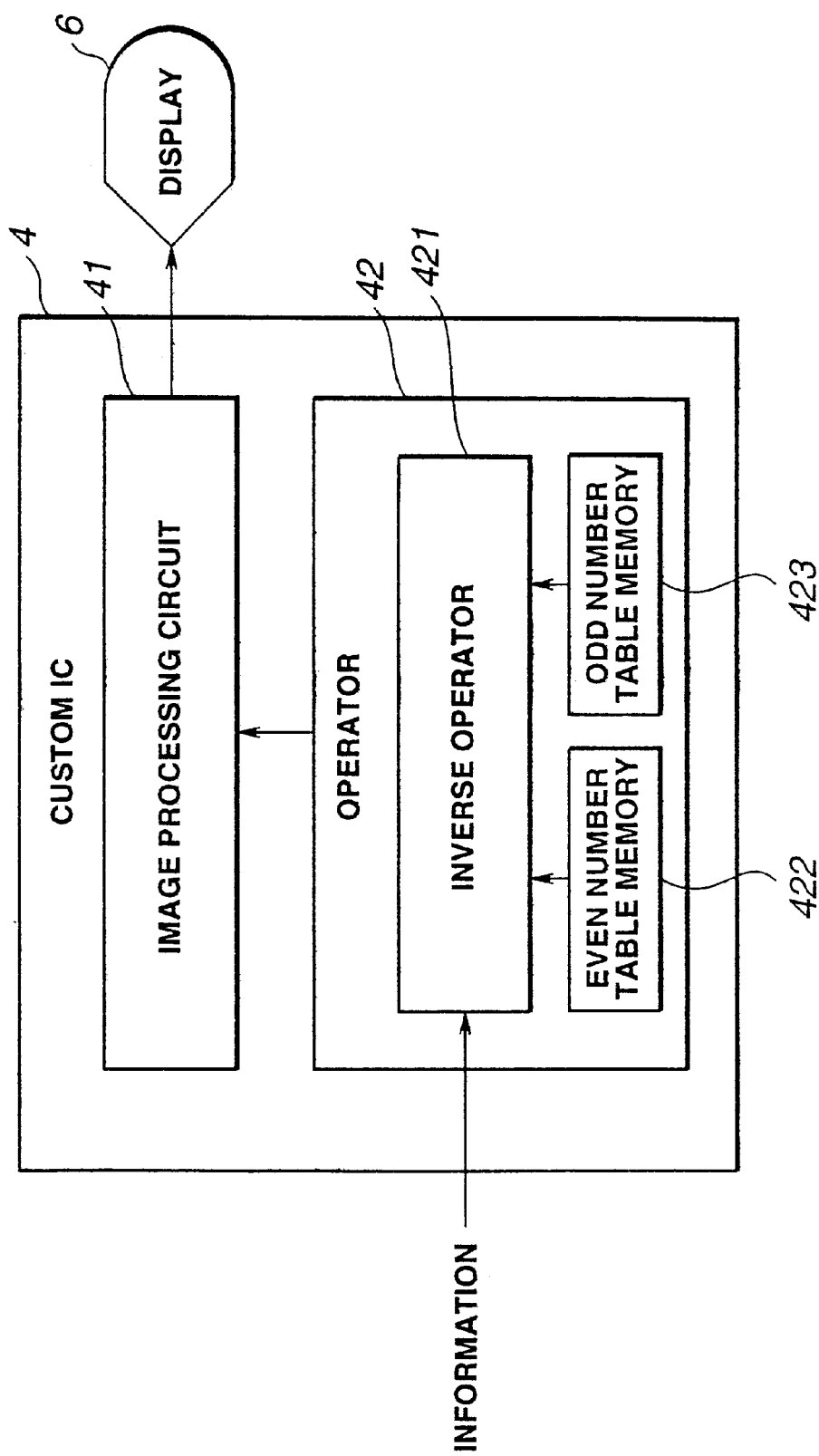
FIG. 2 is a functional block diagram showing the constitution of a custom integrated circuit in the graphics processing system in FIG. 1.

FIG. 2 shows a specific constitution of the custom IC 4 in such a case. As shown in this figure, the custom IC 4 comprises an operator 42 for calculating display parameters. Moreover the operator 42 includes an inverse operator 421 for realizing logic for inverse calculation and, as necessary, is provided other operators, not shown, besides the inverse operator 421. Also, the operator 42 comprises two memories, an even number table memory 422 (corresponding to the first memory) and an odd number table memory 423 (corresponding to the second memory), for storing the tables used in inverse calculation.

Figure 3:
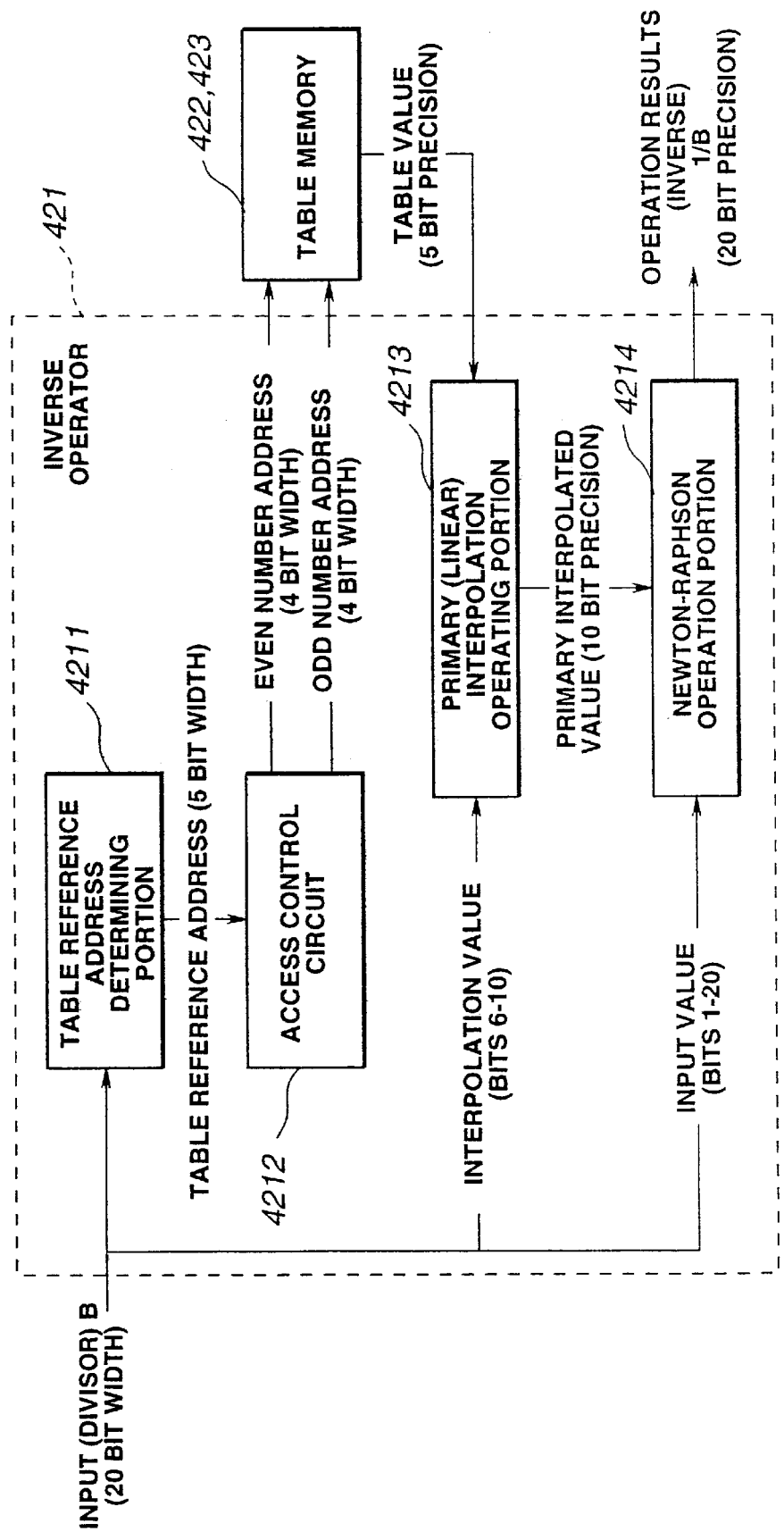
FIG. 3 is a functional block diagram showing the constitution of the inverse operator and table relating to the first embodiment of the present invention.

FIG. 3 shows a specific constitution of the inverse operator 421 and its relationship to the table memory 422, 423. Moreover, the bit numbers in FIG. 3 are a simplified illustration. As shown in this figure, the inverse operator 421 comprises a table reference address determining portion 4211, for determining the table reference address corresponding to the divisor B provided as input, and an access control circuit 4212, for accessing table memory 422, 423 on the basis of the table reference address determined.

Also, the inverse operator 421 comprises a primary interpolation operating portion 4213 (corresponding to the interpolation means), for primary (linear) interpolation of the values read from the tables, and a Newton-Raphson operating portion 4214 (corresponding to the correction means) for applying the Newton-Raphson operation to the primary interpolated value. Moreover, the even number table memory 422, the odd number table memory 423, and inverse operator 421 constitute the arithmetic unit.

Moreover, the sizes of the tables in the first embodiment are determined as follows. The point of hardwiring an operator for calculating the inverse of a numerical value or the inverse of a square root is to effect the Newton-Raphson operation in some way. In view of speed and circuit scale, the Newton-Raphson operation is limited to iteration. For a final precision of 20 bits with the Newton-Raphson operation, the bits of initial value must be ten bits, half the final precision, because the precision (bits) of the value is in principle a doubling of the bits in the initial value.

Here, the scale of the tables is determined by two factors. One factor is the number (sampling number) of calculation results included in the table and is shown as the number of bits. For example, 1024 combinations can be expressed with 10 bits. Also, another factor determining table scale is the bit width of one calculation result. When x to the power of y is expressed as $x^y$, one calculation result is expressed with a width of 10 bits, for example. In other words, the calculation result includes 10 bits and a table with a width of ten bits per one calculation result requires a data capacity of 10 bits× $2^{10}$=10240 bits.

Because this table size is not small, the circuit becomes large in scale. In this case, the large table size results from the initial precision of 10 bits required of the table. This is regardless of whether an indirect method is used for finding the necessary precision of 10 bits. In other words, in the first embodiment, the precision of the initial value attained from the tables decreases and reduces the scale; and meanwhile the value attained from the table is offset by the decrease due to interpolation and the value with the necessary initial precision of 10 bits is attained. For example, a table where one calculation result is expressed with a width of 10 bits and the data type is 5 bit (as in 32) can be constituted with the small capacity of 10 bits× $2^5$=320 bits.

Interpolation with 5 bit precision is effected for the value attained from this table. This method has the same precision as when the Newton-Raphson operation is effected twice for an initial value with 5 bit precision.

Moreover, because a rounding error occurs in the operation process, the error becomes cumulative as the operation is repeated. The operation process therefore requires precision with a certain degree of redundancy (margin). An effective method for improving the precision of the approximate inverse value found by interpolation is to expand the bit width of the inverse values (table value) constituting the inverse table to be referenced, thereby increasing the precision of the value attained from the table. Also, it is effective to increase the number of table values and thereby decrease the range of the error of the approximate inverse value; the precision of the initial value used in the Newton-Raphson method is therefore improved. As a result, the number of bits of the corrected value is low even for the final result and the scale of the operator for finding the final result can be reduced.

Figure 4:
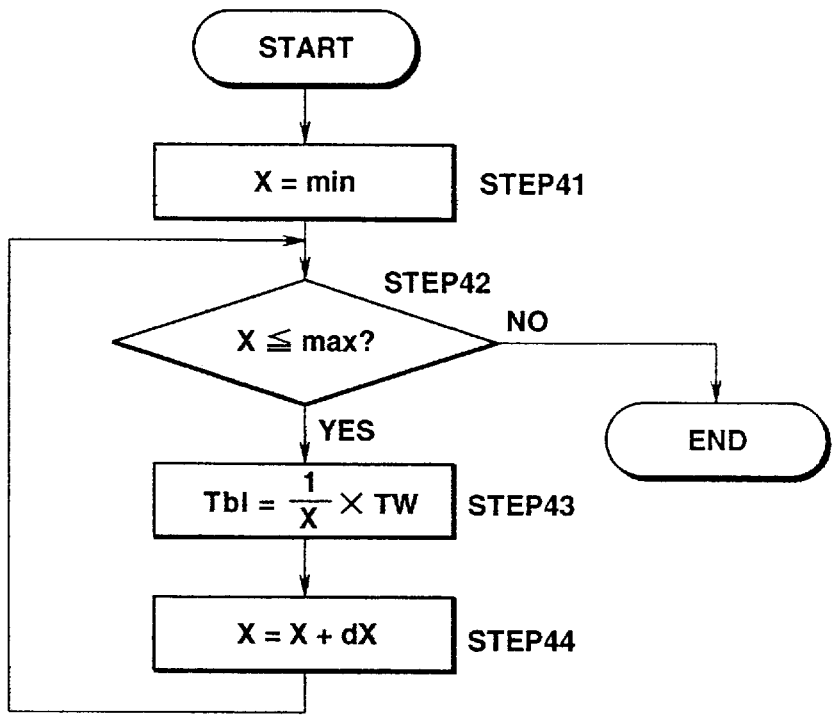
FIG. 4 is a flow chart showing the procedure for preparing a table in the first embodiment of the present invention.

Moreover, FIG. 4 shows the general procedure for preparing such a table. This procedure causes the sampling value X, the original value of the inverse, to increase by an increment dX while finding the table value Tbl corresponding to each sampling value X each time. In this case, the sampling value X becomes 1.0 or more up to 2.0, if it is a floating point mantissa. Also, the increment dX is the value of the necessary range (min≦X≦max) of the found value of X divided by the sampling number. TW is a constant to express the precision of the inverse table below the decimal point and, for example, uses a filter wherein the precision bits are 1 and subsequent bits are 0. The inverse value of the bit number of the data portion in the table can be taken from the true value by multiplying this constant TW with the true value of the inverse calculated from the sampling values.

In the procedure in FIG. 4, the loop counter i is initialized to 0 (Step 41) and the initial value $X_0$ of the sampling value is made the minimum value min in the sampling range (Step 42). The following process is repeated while the loop counter i is incremented (Step 49), until the sampling value X reaches the maximum value max in the sampling range (Step 44).

Specifically, the sampling value X is calculated by adding the product of the loop counter i with the increment dX to the initial value X0 (Step 43). The table value Tbl stored in the table is calculated using this sampling value X and the constant TW (Step 45). Depending on whether the loop counter i is even (Step 46), the calculated table value Tbl is divided between and stored in the even number table memory (Step 47) or odd number table memory (Step 48).

Figure 5:
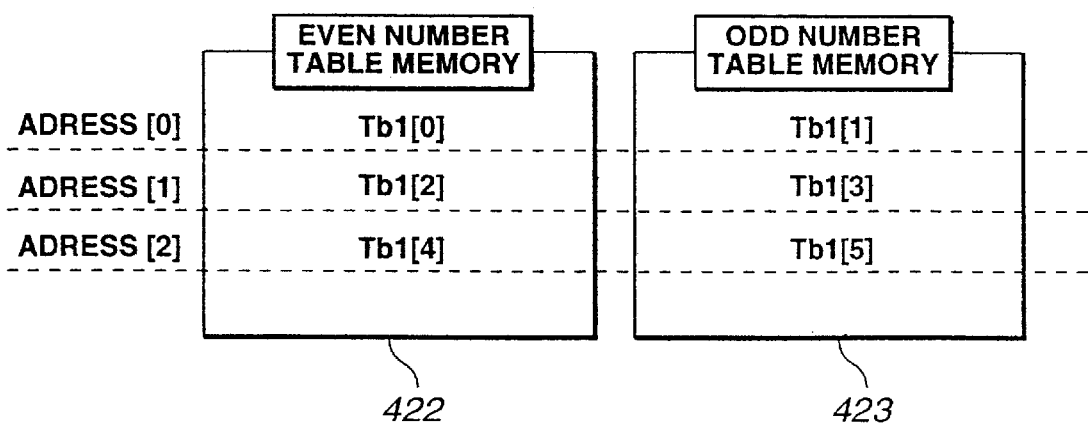
FIG. 5 is a diagram showing the contents of the table relating to the first embodiment of the present invention.
Figure 6:
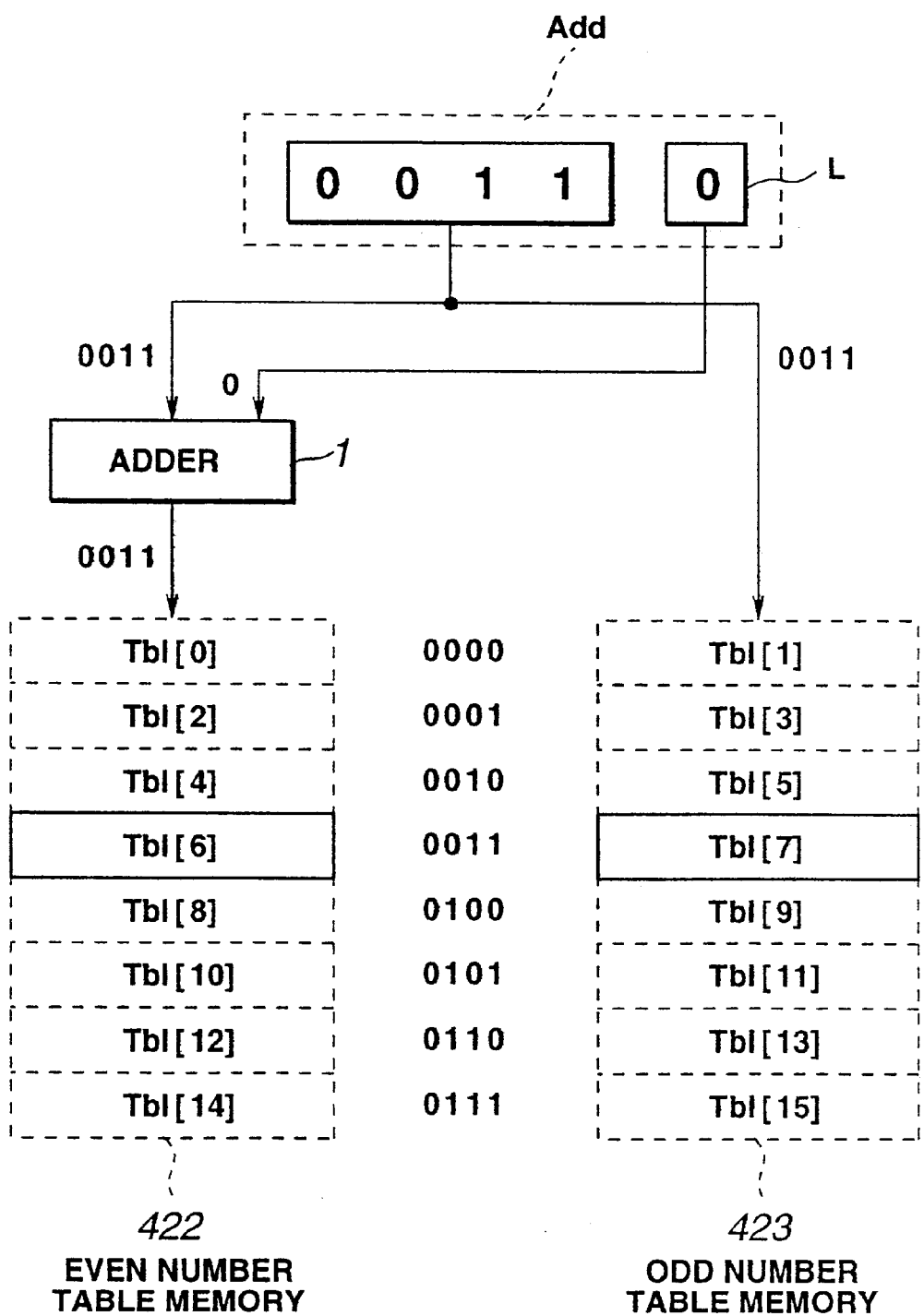
FIG. 6 is a diagram (when least significant bit is 0) showing an example in the case of reading data from the table in the first embodiment of the present invention.

By repeating this process, the calculated table values are stored alternately in the even number table memory 422 and the odd number table memory 423 of the inverse number table. As a result, the contents of the table prepared are in the state shown in FIG. 5, where one table value is expressed as Tbl []. In this state, two adjacent table values are stored at the same address in the even number table memory and the odd number table memory. For this reason, adjacent table values are attained in one read process (access cycle), when accessed with one address designation from both the even and odd table memories. Moreover, the access control circuit 4212 has an incrementizing portion I for reading adjacent table values in one read process (FIG. 6).

(2) Operation and Effects of First Embodiment

The first embodiment having the foregoing constitution operates as follows. In the graphics processing apparatus shown in FIG. 1, the CPU 1 effects information processing for graphics display using RAM 3, on the basis of data and commands input from the input/output apparatus 5 and programs stored in ROM 2.

When the custom IC 4 (FIG. 2) receives information relating to the display image from the CPU 1, the custom IC 4 calculates various display parameters using the operator 42. The processing for inverse calculations, frequently performed in the calculation of parameters, is effected with reference to table memory 422, 423 and the inverse operator. Below, the calculation of inverses in the inverse operator 421 is explained. Moreover, FIG. 7 is a flow chart which shows the general procedure for calculating inverses in the first embodiment.

(2-1) Data Input and Reading Table Values

For example, input B, which is a divisor (number to divide 1), is input as data having a 20 bit width (FIG. 3). When the input B is provided, the table reference address determining portion 4211 takes a bit row with a specific width from the most significant bit (MSB) side of the input B as the table reference address "Add" (Step 71 in FIG. 7).

Figure 7:
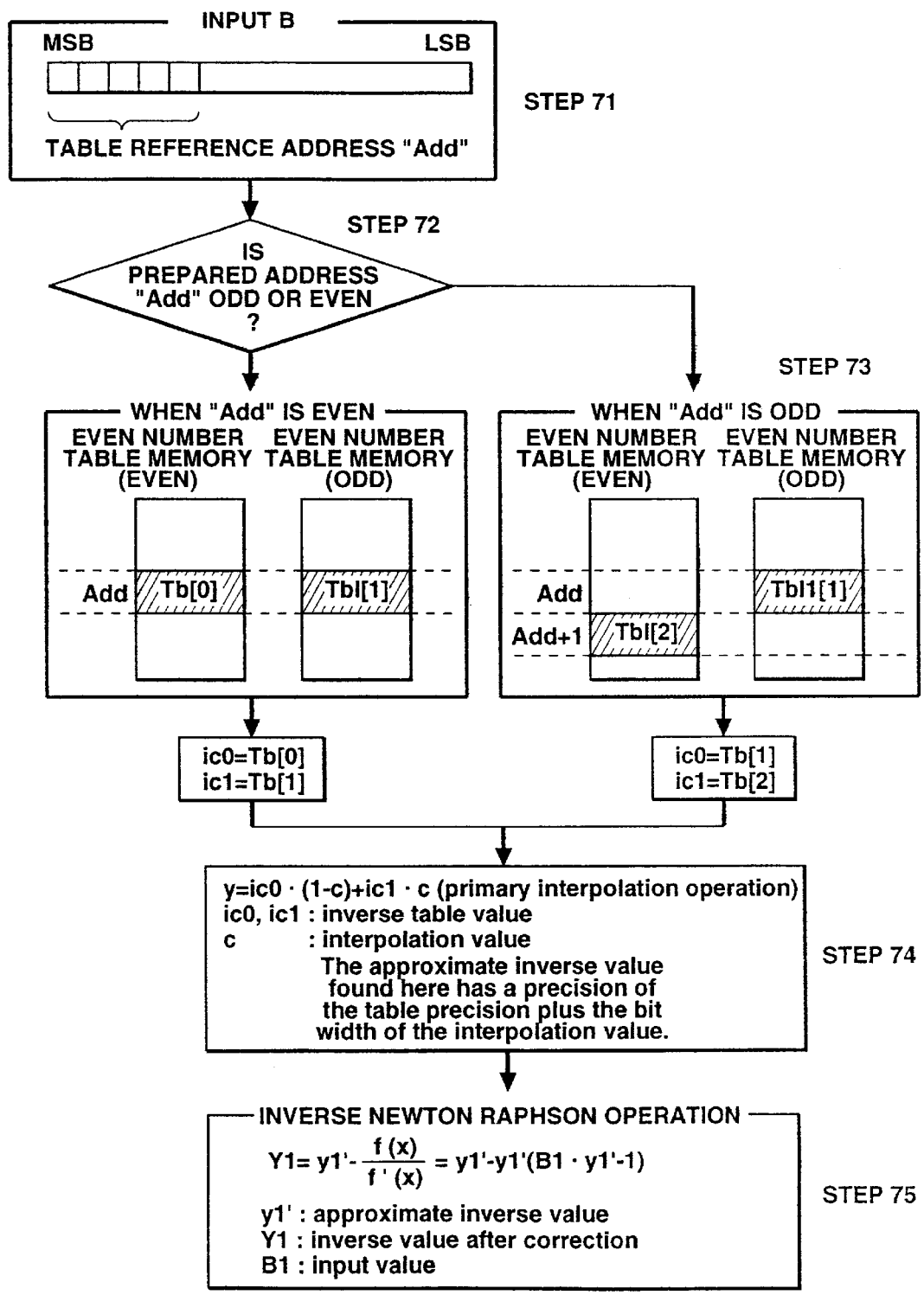
FIG. 7 is a diagram generally showing the procedure for inverse calculation in the first embodiment of the present invention.
Figure 8:
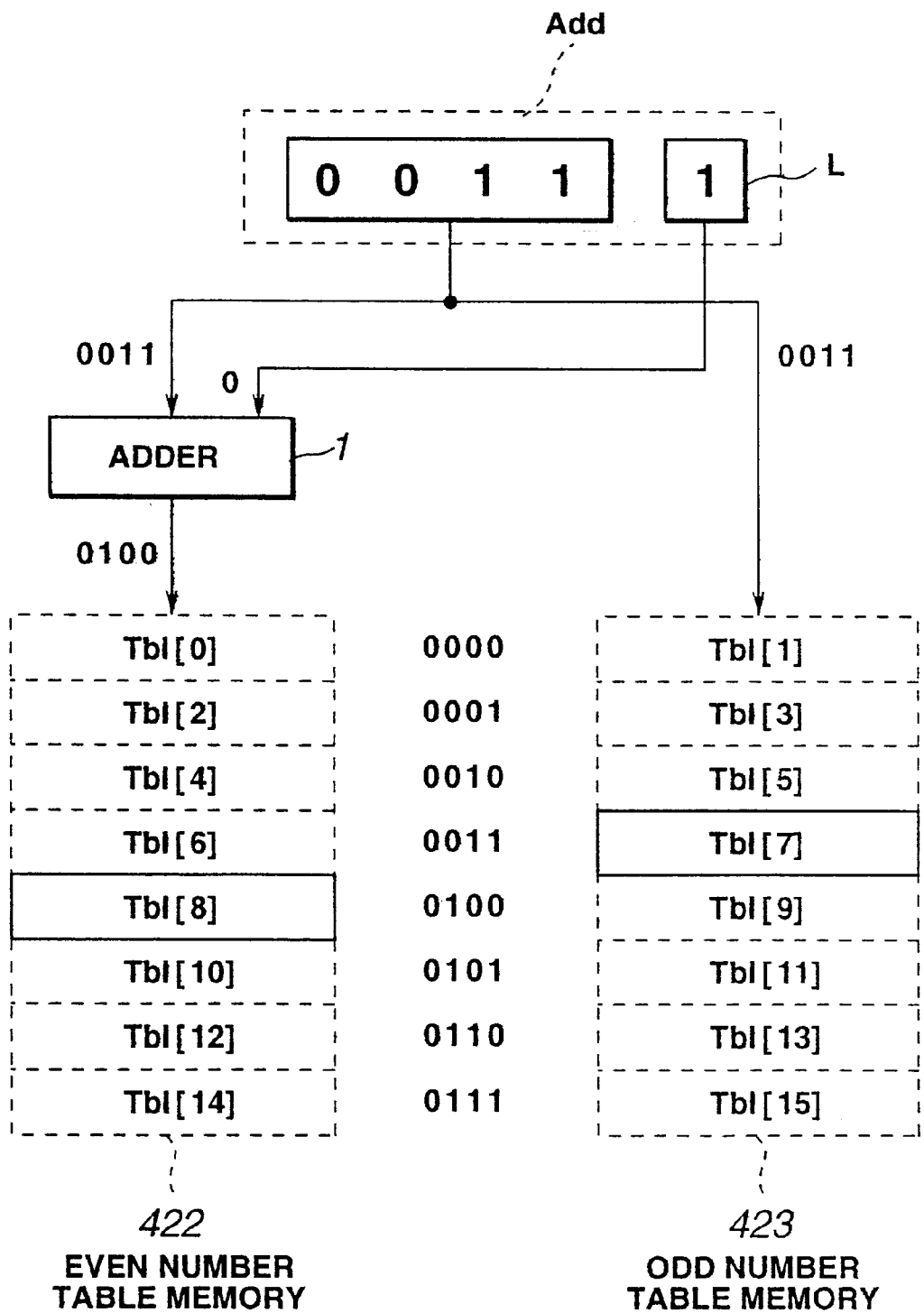
FIG. 8 is a diagram (when least significant bit is 1) showing an example in the case of reading data from the table in the first embodiment of the present invention.

Next, the access control circuit 4212 (FIG. 3) reads the set of table values, corresponding to the address "Add" provided, from the even number table memory and odd number table memory (Step 73), according to whether the address "Add" is odd or even (Step 72 in FIG. 7). FIGS. 6 and 8 are used to further explain the memory access procedure in the first embodiment. Specifically, the address "Add" is even (FIG. 6) if the least significant bit L (corresponding to additional information) is 0, and is odd (FIG. 8) if the least significant bit L is 1. Regardless of whether even or odd, the first four bits (corresponding to address) of the address "Add" are used without further changes as the address read from the odd table.

For the address read from the even number table memory, the incrementizing portion I adds the least significant bit L to the first four bits of the address "Add". As a result, when the least significant bit L is 0 and the address "Add" is even (FIG. 6, corresponding to first mode in claim 6), the address read from the even number table memory is the same (0011) as that read from the odd number table memory. Also, when the least significant bit is 1 and the address "Add" is odd (FIG. 8, corresponding to second mode in claim 6), the address read from the even number table memory becomes an address greater by 1 (0100) than the address read from the odd number table memory. The table values (Tbl [ ]) framed in solid lines in FIGS. 6 and 8 is the data read.

For this reason, when the address "Add" is even, the set of Tbl [ ] and Tbl [1] (FIG. 7) and the set of Tbl [6] and Tbl [7] (FIG. 6) are read, for example. When the address "Add" is odd, the set of Tbl [1] and Tbl [2] (FIG. 7) and the set of Tbl [7] and Tbl [8] (FIG. 8) are read, for example. In the second embodiment, any combination of adjacent table values can be read at the same time in this way; high speed processing is the result.

(2-2) Primary Interpolation

The set of table values read as above is the two inverses corresponding to the two sampling values closest to the input B. The primary interpolation operating portion 4213 effects primary (linear) interpolation for this set of table values (Step 74 in FIG. 7). In primary interpolation, an interpolated value is calculated by adding the two values found from the table at proportions corresponding to the closeness to the original sampling value and the aforementioned input value.

Specifically, primary interpolation is the calculation for finding the y coordinate (inverse value) of the portion corresponding to the actual input value, by presuming that the line, wherein the coordinates of the ends are defined by the two sets, approximates part of the actual function curve, and considering that one set of coordinates is determined by the set of the sampling value (x) and the table value (y), in a two-dimensional coordinate system.

In other words, the calculation of primary interpolation can be expressed as follows for the case where $ic0$ and $ic1$ are table values, c is the interpolation value, and y is the interpolated approximate inverse value.

$$y = ic0 \times (1-c) + ic1 \times c$$

Moreover, the interpolation value c is a value showing the extent of the difference between the sampling values as the input B becomes smaller, in the case where the sampling interval is 1; [c] is 0.5 when input B is located at the center between two sampling values. When the input B has a 20 bit width, for example, bits 6–10, following bits 1–5 used in table referencing, are used as this interpolation value c. In the input B's precision of 20 bits, the precision of a total of 10 bits, with five bits for the address "Add" and five bits for primary interpolation, is thereby the result of the primary interpolation.

Figure 9:
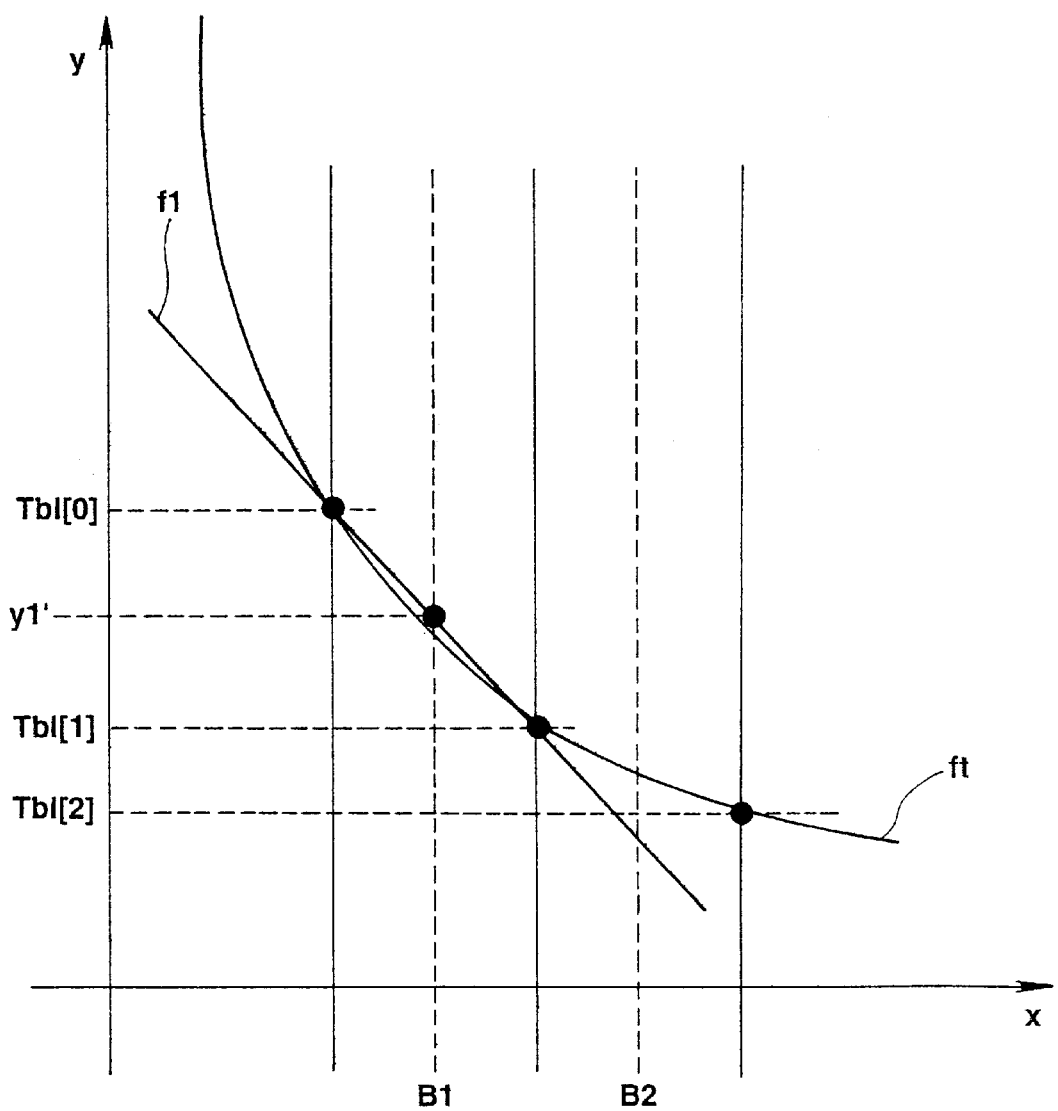
FIG. 9 is a graph generally showing the principle of primary interpolation in the first embodiment of the present invention.

For example, FIG. 9 is a graph which generally shows the principle of primary interpolation. As shown in this figure, $ic0 = Tbl0$ and $ic1 Tbl1$ when $x = B1$ and the approximate inverse value $y_1'$ is found as follows, so that the curve is approximated with the line.

$$y_1' = Tbl0 \times (1-c) + Tbl1 \times c$$

In this way, in the first embodiment, the interpolated value can be found at a high speed with a simple process of adding the two values found from the aforementioned table at proportions corresponding to the closeness to the original sampling value and the input value.

(2-3) Correction With the Newton-Raphson Operation

Next, the Newton-Raphson operation portion 4215 corrects the precision of the calculation results to 20 bits, which is the ultimate objective (Step 75 in FIG. 7), by performing the Newton-Raphson operation in the same way as shown in the prior art for the initial value with a 10 bit precision, which is the result of primary interpolation. Bits 1–20, which are the entire input B, are reflected in this correction.

When $y_1'$ is the approximate inverse value resulting from primary interpolation, Y1 is the inverse value after correction with the Newton-Raphson operation, and B1 is the input value, the Newton-Raphson operation can be expressed as follows.

$$Y1 = y_1' - f(x)/f'(x)$$
$$= y_1' - y_1'(B1 \times y_1' - 1)$$

Moreover, the Newton-Raphson operation in theory is a square convergence, but if the Newton-Raphson operation is applied once, the final precision of 20 bits is attained, because the initial value, which underwent primary interpolation, has a 10 bit precision.

As explained above, the first embodiment has the following advantages compared to the case where an equivalent precision is attained with another method of the prior art. Because a high precision value is created by applying primary interpolation to the initial value attained from the table and the Newton-Raphson operation is applied to this high precision value, the first embodiment can quickly converge upon operation results with the final precision, as compared to the Newton-Raphson repetition method. Also the results can be calculated at high speeds because redundant operations are unnecessary, unlike in the longhand method of repeating the operation by shifting the divisor one digit at a time. Furthermore, the table can be made small in size and the scale of the circuit can be compressed because the precision of the value attained from the table can be dropped by the amount of the primary interpolation, unlike in the table reference method. Because of the above factors, the precision of the operation is improved while processing time remains the same. Also, the precision of the following can be improved: standardization of normal vectors on a screen, perspective conversion, brightness calculations, and the like. Moreover screen noise due to errors can be reduced. The quality of the image drawn is thereby improved.

In the first embodiment, the even number table memory 422 and the odd number table memory 423 are provided as the first and second memory from which data are read at the same time; the table values are stored alternately in the even number table memory 422 and the odd number table memory 423. Whereby, for any combination of adjacent table values, one is stored in the even number table memory 422 and the other is stored in the odd number table memory 423. For this reason, the time necessary for reading is cut in half and the processing works at a high speed, because two adjacent table values can be read by accessing the even number table memory 422 and the odd number table memory 423 at the same time in one access cycle.

Also, in the first embodiment, both the even number table memory 422 and the odd number table memory 423 are accessed at the same address and two adjacent table values are read, when the least significant bit in the table reference address "Add" is 0. The pair of table values in this case is a pair comprising the table value from the even number table memory 422 and the table value which directly precedes it. Meanwhile, when the least significant bit is 1, the address of the even number table memory 422 does not change, but the address of the even number table memory 422 is incremented by 1. For this reason, the pair of table values, comprising the table value from the even number table memory 422 and the table value directly following it, is read. In this way, table values stored alternately in the even number table memory 422 and odd number table memory 423 can be easily read in the desired combination depending on the least significant bit of the address provided.

Also, in computer graphics, there are many calculations using inverse numbers; these calculations in particular require a lot of operations. In the first embodiment, the calculation of inverse numbers is handled with a combination of the table reference, interpolate operation, and Newton-Raphson operations; the contribution to the speeding up of the entire system is therefore great.

(3) Second Embodiment

The second embodiment, it reduces the circuit scale of the operator because the sign of the correction in the Newton-Raphson operation is standardized and so this embodiment does not require a sign determination circuit. In the second embodiment, an offset value is added to the inverse table values and the inverse table prepared so that the sign of the $B1 \times y_1' - 1$ portion in the equation shown in Step 75 in FIG. 7 is standardized to be either positive or negative. In other words, when the approximate inverse value $y_i'$ agrees completely with the true value, it becomes $B1 \times y_1' = 1$, but because the $y_1'$ found by primary interpolation is an approximate inverse value, $B1 \times y_1' = 1$ is not necessarily the case and there is a possibility that $B1 \times y_1' < 1$ or $B1 \times y_1' > 1$. This is because when $y_1'$ is made a table value of the true inverse function value, the error is included in the referenced table value as well.

Figure 10:
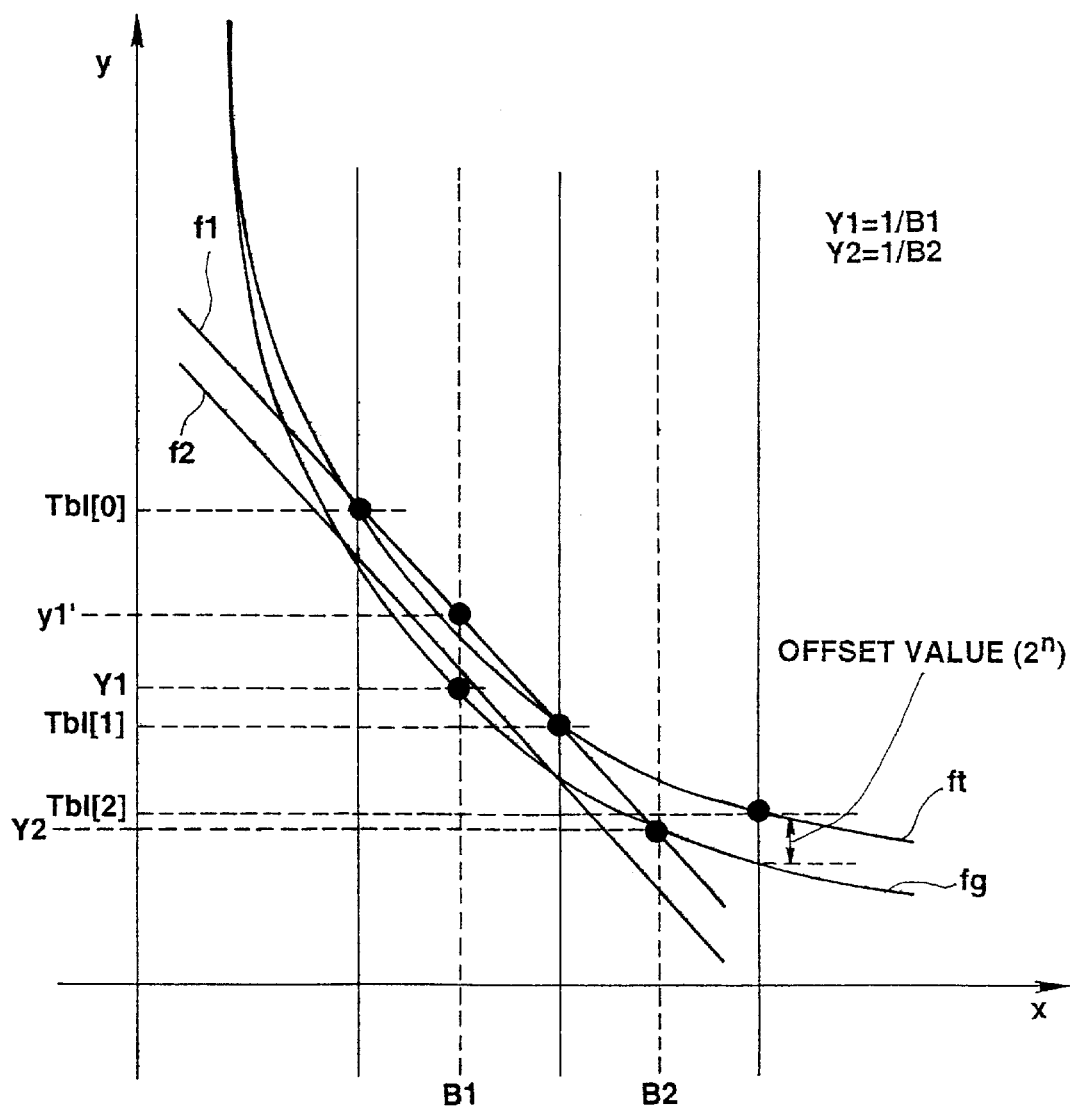
FIG. 10 is a graph generally showing the principle of primary interpolation in a second embodiment of the present invention.

For this reason, the function curve of the table value fg is shifted in relation to the function curve ft of the true value with the addition of the offset value to the inverse number table value in advance and the sign of the error generated is standardized. FIG. 10 is a graph showing the shift of these curves ft and ft. For example, the approximation line fl between table values Tbl [0], Tbl [1] is displaced in a positive direction in relation to the function curve ft of the true value, but because the shift is slight, the sign of the correction in the operation varies between plus and minus with the influence of the error.

Moreover, this offset value is the range of the error absorbed by the Newton-Raphson operation. For example, when an initial value with 10 bit precision is used in the Newton-Raphson operation and if a table with 13 bit resolution is used, the error is absorbed by the Newton-Raphson operation, even with the addition of the error, which is the offset value up to the margin of three bits.

In the second embodiment, the offset value added to the inverse table value is determined as follows. Because the portion below the precision of the table value is eliminated in table preparation, the table value is presumed to be smaller than the true value. The value below operation precision is eliminated during operations after the table is used; as a result, the error increases in the same way and the convergence in the Newton-Raphson method is delayed. Furthermore, the digits of the correction increase as a result of this elimination; this causes the problem of increasing circuit scale. Adding 1 to the least significant bit of the table value results in an increase of slightly more than the true value.

Figure 11:
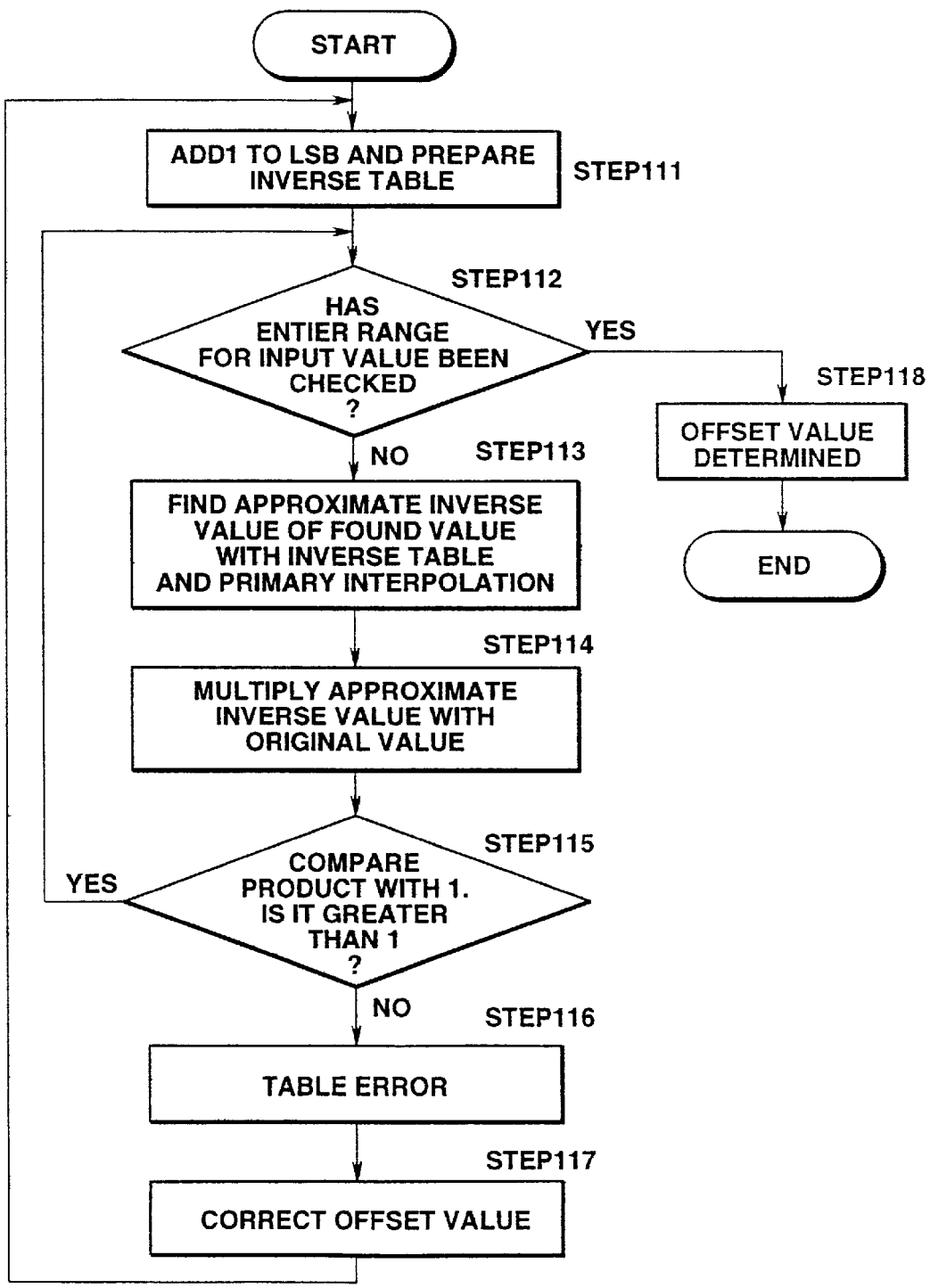
FIG. 11 is a flow chart showing the procedure for determining offset value in the second embodiment of the present invention.
Figure 12:
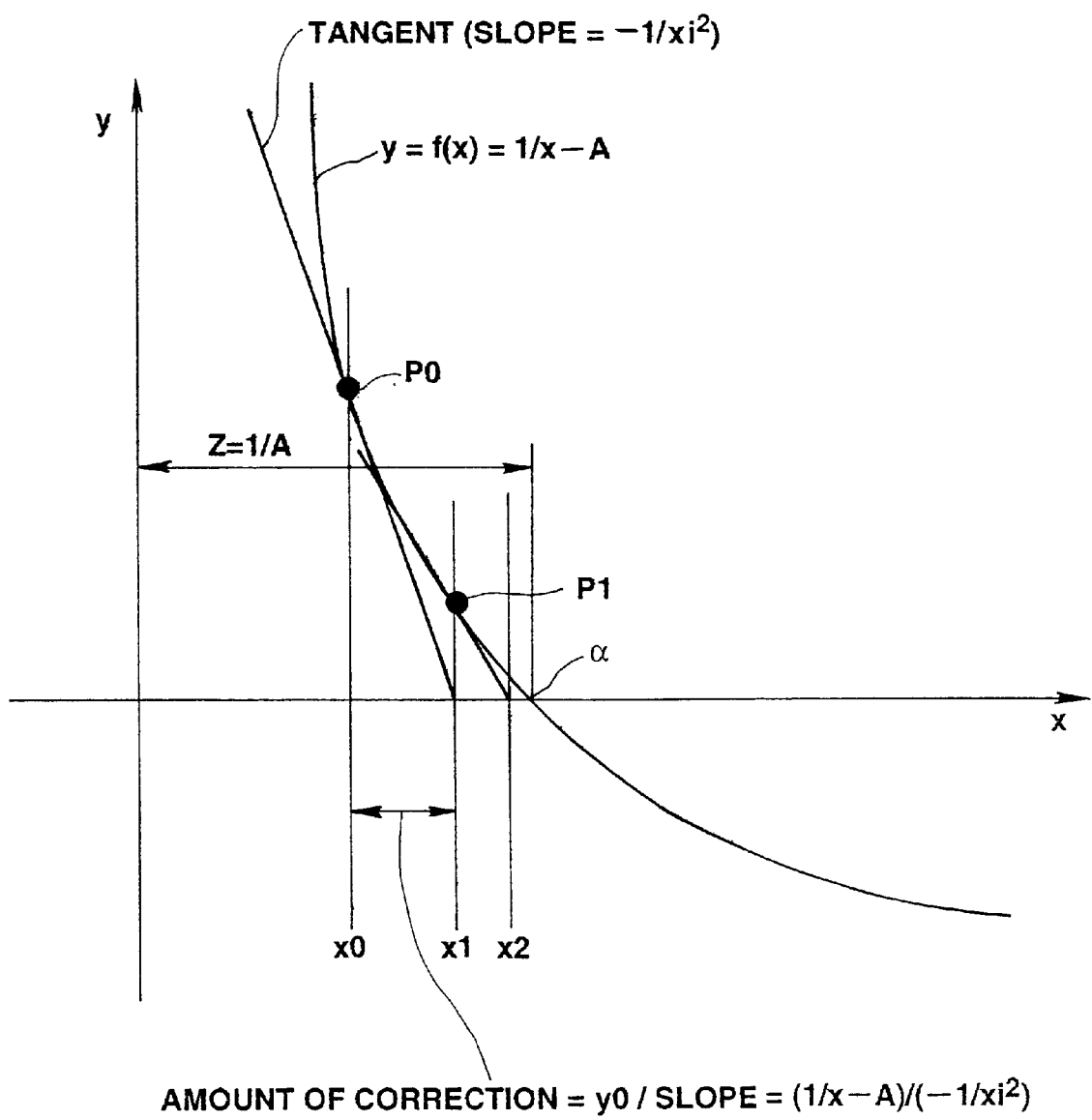
FIG. 12 is a diagram showing an example of a graph relating to the Newton-Raphson operation.

Here, FIG. 11 is a flow chart showing the procedure for determining the offset value. To determine offset value, 1 is added to the least significant bit and an inverse table is prepared (Step 111); the following check process is repeated until a check is completed the entire range of values input (Step 112). In other words, the approximate inverse value of the value found is found with the inverse table and primary interpolation (Step 113) and the approximate inverse value and original value are multiplied (Step 114). Because it is the product of the original value and the inverse value, the product becomes less than 1 when the inverse value includes a minus error and becomes greater than 1 when the inverse value includes a plus error.

Then the product is compared to 1. If the product is greater 1 or more (Step 115), the check moves to the next value. On the other hand, if the product is less than 1 in Step 5, this means that a table value including a minus error is present. This is designated an error (Step 116) and corrected in the direction of increasing the offset value (Step 117), and the inverse table is prepared again (Step 111). In this way, by repeated checking while the offset value is altered, the minus error is not present in the table values and the minimum offset value is found.

Moreover, in this case, the equation in Step 45 becomes the following.

$$Tbl = 1/X \times TW + a$$

a is the offset value; it is the value of the LSB1 of the precision of the table value plus the correction value. In other words, the offset value a is at least the value of 1 added to the least significant bit LSB according to the precision of the table value. Usually, this value is a value greater by the amount of the correction in Step 117. As a result of this determination of table values, the approximate line f2 corresponding to the approximate line f1 in the first embodiment is in a state of being shifted downward sufficient in relation to the function curve ft of the true value, as shown in FIG. 10. The correction value in the Newton-Raphson operation thereby does not vary as to sign due to the influence of the error and the sign of the correction is standardized.

In the second embodiment, the table value is shifted by the offset value as noted above. Because the sign of the correction used in the Newton-Raphson operation is thereby standardized, the sign determining circuit becomes unnecessary and the scale of the circuit can be further reduced.

(4) Other Embodiments

Moreover, the present invention is not limited to the foregoing embodiments and includes other embodiments such as the following.

For example, the forms of the table, precision, functions, and the like, shown in the prior art and the embodiments of the present invention, are simple illustrations and can be constituted freely in accord with the objective. Also, the address to access the first memory (even number table memory) according to the least significant bit of the table reference address may be changed to an address to access the second memory (odd number table memory).

Also, the values are not necessarily shifted in the table. Also, the operations to which the present invention is applied are not limited to inverse numbers and inverses of square roots; the present invention can be applied to other operations including these or other operations excluding these. In the arithmetic unit of the foregoing embodiments, wherein the interpolation means and correction means are installed, the first memory and second memory which can be accessed simultaneously are installed as means for storing data, but this memory may also be used for other purposes alone; in such a case, data stored in memory is limited to the table values.

Also, the interpolation means is not limited to the linear interpolation mentioned above and includes other operations which obtain the same results, such as an approximate operation using a quadratic curve function.

As above, the present invention can provide an arithmetic unit and operating method, which are highly precise, and wherein the circuit is on a small scale and operates at a high speed.

What is claimed is:

1. An arithmetic unit comprising:

memory means for memorizing a table for finding operation results, which correspond to input values, using operation results calculated in advance;

interpolation means for interpolating values found from said table at an intermediate precision for an initial value of a Newton-Raphson operation; and correcting means for correcting the interpolated value to the final precision with a Newton-Raphson operation.

2. The arithmetic unit according to claim 1 wherein said interpolation means is constituted to calculate the interpolated value by adding the two values found from said table at proportions corresponding to the closeness to the original sampling value and said input value.

3. The arithmetic unit according to claim 1 wherein the intermediate precision for said initial value is ½ or more of said final precision.

4. The arithmetic unit according to claim 1 wherein the value of said operation results of the table are shifted so that the sign of the correction, used in said Newton-Raphson operation, is standardized.

5. The arithmetic unit according to claim 1 being constituted to find the inverse of the numerical value provided or the inverse of the square root of the numerical value provided.

6. An operating method comprising:

a table process for finding operation results corresponding to input values using a table with operation results calculated in advance;

an interpolation process for interpolating values found from said table at an intermediate precision for the initial value of a Newton-Raphson operation;

a correction process for correcting the interpolated value to the final precision with the Newton-Raphson operation.

7. The operating method according to claim 6 wherein said interpolation process is a linear interpolation process.

8. The operating method according to claim 6 wherein said interpolation process is a process for interpolating the values found from said table at the intermediate precision of ½ or more the final precision.

9. The operating method according to claim 6 comprising said table wherein the value of said operation results are shifted so that the sign of the correction, used in said Newton-Raphson operation, is standardized.

* * * * *